2,904,449
METHOD AND COMPOSITIONS FOR FLAME SPRAYING

Samuel W. Bradstreet, Oak Park, Ill., assignor to Armour Research Foundation of Illinois Institute of Technology, Chicago, Ill., a corporation of Illinois No Drawing. Application July 26, 1955
Serial No. 524,598

8 Claims. (Cl. 117—46)

The present invention is directed to methods of and compositions for applying refractory coatings onto a variety of surfaces. The invention finds particular utility in coating metal surfaces to protect the same against oxidation and other high temperature effects, but is also applicable to the coating of various surfaces such as glass, carbon, concrete, refractories, and various other materials.

The process of the present invention involves flame spraying a particulated material onto a surface under conditions such that the coating which results is securely bonded to the surface to be coated and, in most instances, provides a refractory thin outer shell making the coating useful in environments where it could not heretofore have been used in the absence of the coating. For example, the process of the invention finds particular application in the coating of metal surfaces for use in rocket nozzles, as coatings for turbine blading, and various other applications where a metal surface must be modified in order to adapt it for extreme high temperature conditions.

While the technique of flame spraying has been applied previously to metals and in some instances to ceramic materials such as refractory oxides, the latter have not always proven successful for various reasons. In many instances, attempts to coat surfaces with ceramic materials involved the deposition of a glassy coatings on the surface, resulting in the production of an amorphous coating. These coatings have generally been unsatisfactory for high temperature work because the glass and the underlying substrate have coefficients of thermal expansion which are immutable and seldom equal. As a consequence, the interface between them is usually stressed by heating or by cooling. Because of the brittle nature of glass, these stresses frequently cause failure in the coating by cracking or chipping. Accordingly, the present invention makes use of materials which are refractory but not glassy, i.e., they retain the crystalline structure of the starting materials without forming an amorphous glass composition during or after deposition of the coating onto the surface by the flame spraying process.

The improved results obtained by the process of the present invention are believed due, at least in part, to the recognition that the coating which is applied by the flame spraying process should retain its crystalline characteristics and should be a sintered rather than a completely fused coating. The results obtained from products produced according to the present invention have more than justified this assumption.

Accordingly, an object of the present invention is to provide an improved process for flame spraying various refractory materials onto surfaces.

Still another object of the invention is to provide an improved method for applying a sintered refractory coating onto a metal surface under conditions such that there is a good mechanical as well as possibly a chemical bond between the material of the coating and the underlying metal.

Another object of the invention is to provide an improved process for applying flame sprayed coatings which results in better distribution of the coating on the surface, and a more efficient use of heat.

Still another object of the invention is to provide improved compositions for use as flame spraying compositions.

In any flame spraying process, there are only a few variables which are under some degree of control by the operator. The first of these is the composition employed which, of course, is variable at will. The second is the size of the particles employed. A third is the flame temperature involved, which depends primarily upon the fuel being burned in the flame spraying torch. A fourth is the control of the residence time of the particles in the flame prior to the time the particles strike the surface. This, however, is not capable of wide variation because the particles must have a minimum velocity of a relatively high order in order to be propelled properly through the flame. Generally, the residence time of particles in the flame is measured in units of hundredths of a second, this being the interval between the time a given particle is injected into the flame and the time it appears as part of the coating on the object.

Basically then, the operator has control over the compositions, the size of the particles, and the flame temperature. Nevertheless, it frequently happens that the sintering temperature of the particular material chosen for its refractory properties is in excess of the temperature which the particles reach during their presence in the flame. In these situations, new techniques are required to achieve the desired sintering effects and the retention of the desired crystalline structure.

Perhaps the simplest technique for increasing the temperature of the particles is to reduce the particle size as low as possible. However, except in very few cases, the reduction of particle size is, in and of itself, insufficient to create the difference between a sintering and a non-sintering condition in the flame. In addition to this, there is the additional complication that the reduction of the particles to extremely small sizes presents feeding problems in delivering the particles into the flame.

A more satisfactory solution resides in providing fluxes in combination with the refractory oxides which form a liquid medium in which the sintering reaction may occur. Particularly good results have been obtained by employing phosphate binders, particularly the metaphosphates and pyrophosphates of calcium and magnesium in conjunction with alpha alumina. Generally from about 2% to about 10% of the composition by weight may consist of the phosphate, the remainder being the refractory oxide. The relatively non-volatile calcium and magnesium phosphates are preferred, but the more volatile sodium and potassium phosphates may be employed in addition to the preferred compounds.

One particularly effective means for raising the temperature of the flame so that is provides a sintering atmosphere for the particles contained therein is to include a flame catalyst in the composition fed into the flame. A flame catalyst is a material which is capable of catalyzing the oxidation reaction being carried out in the flame and thereby raise the temperature of the catalyst surface. In the case of an oxyhydrogen torch, for example, one would select a catalyst material which is capable of catalyzing the oxidization of hydrogen. Whether or not a given material is a flame catalyst is a relatively easy thing to determine. However, the theory of flame catalysis has never been extensively developed. The following theoretical explanation has been developed as a result of the experimental work leading up to the present invention, and seems to be borne out by the results obtained.

It appears that a metal oxide, to catalyze the reaction in the flame must have the following characteristics. First of all, the catalyst should be a metal oxide in which the oxygen to oxygen distance on the outside of the solid oxide is close to that of a closed packing system, whether of the cubic or the hexagonal type. In other words, the interatomic distance should be close to the value of 2.92 Angstrom units characteristic of the close packing system. When this condition exists, it seems to favor the formation of hydroxyl ions on the surface of the catalyst, thereby, tending to carry the combustion reaction toward completion, since the formation of hydroxyl ions is believed to be an intermediate step in all of the gas combustion reactions which produce water as an end product.

The next requirement is that the catalyst be partially reduced by the fuel gas used. For example, the oxides of most of the transition metals are reduced by hydrogen at the temperature of the oxyhydrogen flame.

The flame catalyst used need not be an oxide; if a metal which will coordinate oxygen ions or hydroxyl groups is used. This metal will also act as a flame catalyst. Thus nickel oxide is not a particularly good flame catalyst because it is only slightly reduced by hydrogen, while finely powdered nickel metal, which oxidizes slightly in the neutral oxyhydrogen flame, is more effective. Where the catalyst oxide is volatile (molybdenum or vanadium oxides for example) the heat gained by flame catalysis may be lost as heat of vaporization, but if the particles are rendered sufficiently incandescent before vaporizing, their radiation serves to heat adjacent non-catalytic particles. In summary those materials may be regarded as effective additives which by their presence increase the apparent optical temperature of the incandescent powder stream. A list of such additives includes magnesium pyrophosphate, sodium acid phosphate, ilmenite (a ferric titanate mineral) aluminum acetate, aluminum phosphate, chromium metal or reduced chromium oxide, and lithium aluminate; all of these may be combined with alpha alumina as the major constituent of the powder feed.

Generally, I prefer to include about 2 to 8% of the flame catalyst in the composition, but actually the percentage of the flame catalyst may vary from very minute amounts such as 0.1% to as high as 10% or more.

Certain flame catalysts work better with selected refractory materials. For example, cerium oxide provides an excellent flame catalyst with zirconia but is not particularly effective with other types of refractories. Vanadium oxide is very effective with alpha alumina. Cobalt oxide is particularly effective with zirconia in an oxyacetylene flame, while gamma alumina is a flame catalyst for oxyhydrogen reactions. Similarly, chromic oxide is a very effective flame catalyst with zirconia while manganese dioxide is effective with alpha alumina.

The addition of a flame catalyst is particularly effective in conjunction with the application of alpha alumina as a flame sprayed coating. It has been demonstrated that the addition of even a small amount of the flame catalyst can make the difference between securing an adherent, sintered coating of the alumina onto the surface of the article or a coating which is very likely to crumble off or flake off.

The preferred vanadium oxide may be added to the flame as such, but it is preferable to add a material to the flame which will decompose under the conditions of the flame to yield either the vanadium trioxide or the vanadium pentoxide. Hence, the starting material is preferably a compound such as ammonium vanadate.

In connection with the flame catalysis, it should be noted that the theoretical temperature of an oxyacetylene flame is about 3000° C., and that the actual flame temperature is on the order of 2200° C. In the case of the oxyhydrogen torch, the theoretical temperature and the actual temperature are about 300° C. lower than those of oxyacetylene. The sintering temperature of alumina is on the order of 1200° C.

While the flame temperature varies substantially, depending upon the type of fuel being burned, it is preferable to employ a flame which has a temperature of at least 1500° C. in order to insure adequate sintering of the refractory oxides. It is also desirable to employ a "soft" flame, that is, a flame having little or no excess oxygen over the amount stoichiometrically required for the combustion reaction to go to completion. In fact, the flame may be a reducing flame and still operate satisfactorily.

The increase in flame temperature which occurs through the use of flame catalysts also has the desirable effect of helping to break up the particles in the flame, thereby producing still smaller particle sizes which, in turn, again helps to increase the effective temperature of the particles.

It is interesting to note that the compound gamma alumina is an auto-catalyst for an oxhydrogen flame, so that the temperature of the flame is automatically increased by the injection of the gamma alumina powder into the flame. Accordingly, this compound alone is a very suitable starting material for the application of alumina coatings. The expensive gamma alumina may be replaced wholly or in part by using a material which forms gamma alumina in the flame, e.g. alpha alumina monohydrate, aluminum acetate, or bauxite. The absorption of heat by the powder can be accelerated by inclusion of an isomorph of gamma alumina which either acts as a flame catalyst (cobalt oxide) or to increase, in solid solution, its absorption of radiant heat (titania), or as a flux (magnesium fluoride).

Instead of modifying the flame temperature, or in addition thereto, adequate sintering can be achieved by combining two compounds which are isomorphous in structure so that they are capable of forming a fluid phase for a short time under the influence of the flame to rearrange themselves into a crystalline material having a higher melting temperature than other combinations of the components. The most important class of compounds which can be produced in this way are the compounds having a spinel structure. True spinel is the combination of magnesia and alumina in a face-centered cubic lattice, and this type of compound can be produced in the process of the invention by injecting suitable amounts of alumina and a source of magnesium atoms into the flame. The resulting coating is found to contain not only spinel itself ($MgO.Al_2O_3$) but gamma alumina, which has the spinel structure and nearly the same lattice parameters, and is therefore said to be isomorphous with spinel and to a certain extent capable of forming solid solutions with it. For this reason particularly good results are obtained when the refractory material is itself a spinel or perovskite, since the latter are close-packed oxygen lattices and therefore flame catalysts. As examples of the spinels, gamma-alumina, chromite ($FeCr_2O_4$), magnetite ($Fe_3O_4$), picrochromite ($MgO.Cr_2O_3$), reduced ilmenite $$(Fe_2TiO_4.Fe_2O_3)$$

nickel aluminate, ($NiAl_2O_4$), and magnesium titanate, ($Mg_2TiO_4$). The cell size for such spinels varies from 7.9 for gamma-alumina up to 8.48 for the ferrite spinels; the latter are consequently more nearly isomorphic with zirconia rather than with alumina systems. It is interesting to note that lithium aluminate forms, with moderate heating, a spinel ($LiAl_5O_8$) in which the so called "defect gamma" structure is stabilized. As examples of perovskite ($CaTiO_3$) structures, the major types which have been investigated fall into the ilmenite ($FeTiO_3$) and corundam (alpha-alumina) systems, in which the metal atoms occupy two-thirds of the octahedral holes in a hexagonal close-packed oxygen lattice. The pyrophosphate structure can be regarded as an infinite three-dimensional structure of $PO_4$ tetrahedra linked in hexagonal close packing by magnesium ions above and below the hexagon centers.

Particularly good results are obtained if the alumina employed is a gamma alumina or a source thereof such as aluminum acetate. In this connection, it should be noted that while the present disclosure deals primarily with the use of refractory oxides as the coating materials, it will be evident that the oxide per se need not be employed, but compounds which yield the oxides under the conditions of the flame are also usable, and in some cases preferable. For example, carbonates of magnesium, aluminum, or zirconium can be employed as starting materials or as mentioned previously, aluminum acetate is an excellent source of gamma alumina. The use of aluminum acetate has the further advantage of providing an anti-clogging agent in the composition to prevent caking or packing of the alumina particles present.

A source of vanadium oxide in the flame provides uniquely improved results because vanadium oxide is isomorphous with alumina and is also a flame catalyst, as previously mentioned.

The applied coating need not consist entirely of the spinel or the perovskite type structure, as the spinel or perovskite serves as an effective binder for systems composed predominately of magnesia, alumina or the like even when present in relatively small amounts.

Still another technique which is effective to raise the temperature of the particles in the flame is that of adding a material to the composition which will undergo an exothermic reaction while in the flame. Specifically, certain metals can be added in finely divided form to the oxides or sources of oxides injected into the flame and such metals will undergo an oxidation which effectively raises the temperature of the particles in the flame. Particularly preferred for this use is aluminum powder which becomes oxidized under the conditions of the flame to produce aluminum oxide and serves as an added source of alumina in the coating. In addition, metals such as chromium, nickel, cobalt and silicon can be employed for the same purpose. Preferably, about 5 to 7% by weight of the composition may consist of the powdered metal through as little as $\frac{1}{10}$ of 1% or as high as 10% may be used in some cases. It is not necessary to use a pure metal, as long as the material used represents a source of the metal in the flame. Thus, ferrosilicon is a good source of silicon, and ferromanganese is a good source of manganese.

The equipment used to apply the flame sprayed coating may be any of a variety of flame spraying apparatus. The simplest consists of an oxyacetylene or oxyhydrogen cutting torch or blowpipe which is modified by the inclusion of a venturi nozzle to permit injection of the finely divided particulated mixture of the refractory oxide or the like together with any other additive such as a flame catalyst, powdered metal, or the like. The powdered mixture is carried into the flame in the oxygen stream and the other gaseous stream such as hydrogen, methane, acetylene, or the like is injected separately into the venturi.

As previously indicated, the particle size being fed into the flame may vary substantially. Particles as low as 2 or 3 microns in maximum dimension have been used successfully, and particles as large as 30 mesh have also been employed satisfactorily. However, for most purposes, a particle size between about 200 mesh to less than 500 mesh will be found to be the most satisfactory.

In order to improve the characteristics of the bond which occurs between the coating and the underlying surface, it is desirable to roughen the surface prior to application of the coating. This can be done in the case of a metal for example by phosphatizing the surface or by abrading it as by sand blasting or the like.

One of the advantages of the coatings of the present invention is that they are considerably more efficient in the utilization of the heat of the flame than other types of flame spraying systems. Since the particles are in discrete form, they need only be surface heated to the extent of having the particles bond together by sintering action rather than utilize a considerable amount of the heat of the flame in melting a solid rod of the material and spraying it as a molten mass onto the surface to be covered. In operating the process of the present invention, the particles should reach the surface to be coated at their highest temperature. This means that for every application, there is probably a limited range of spacing which can be employed between the nozzle and the surface being coated. This spacing is easily determined because at the proper spacing, the coating goes on fastest, and the position at which the coating is being applied at the fastest rate is readily visible to the eye.

One of the other outstanding advantages of the process of the present invention resides in the fact that the article to be coated need not be heated prior to application of the coating. This means that the system of the present invention can produce prestressed coatings on metal bodies.

For example, stainless steel has a coefficient of thermal expansion which is substantially lower than that of alumina. However, the alumina when applied is quite hot, while the steel is cold so that when upon cooling, the coating is put in compression about the stainless steel body. As a consequence, upon sudden heating, further compressive stress in the coating occurs, but the disoriented and somewhat porous nature of the coating resists the tendency toward failure by chipping which occurs in vitreous coatings under compression on cooling, the compressive stress in the coating is reduced but is not made destructively negative even when the sample is plunged at red heat into water. As a result, these coatings are less dependent upon a close watch of thermal expansion coefficients than are vitreous coatings, and are at the same time less rigid or brittle.

The following examples illustrate the method of applying the coatings to the present invention, and the results obtained.

*Example I*

A flame spraying mixture was prepared by mixing 200 parts by weight of 60 mesh alumina (corundum) with 20 parts by weight of magnesium pyrophosphate, and 5 parts by weight of aluminum acetate. The powder was injected into an oxygen stream being fed to an oxyacetylene torch. The tip of the torch was held a few inches away from a steel plate which was to be coated. The flame sprayed coating which resulted built up an excellent film and was tightly adherent to the surface. Improved results were obtained when the surface of the steel was pretreated with a solution of phosphoric acid and sand blasted prior to application of the flame sprayed coating.

*Example II*

A flame-spraying mixture was prepared by grinding mullite ($3Al_2O_3.2SiO_2$) to −500 mesh. (A small amount, 0.1%–1.0%, of aluminum acetate may be added to reduce packing of the powder in the feed hopper.) The powder was aspirated into the oxygen stream of a hand blowpipe (National Type 3A or equivaelnt modified to give unrestricted oxygen flow) and oxygen and hydrogen pressures were balanced to give a neutral or slightly reducing flame about 7 inches long. A steel plate, lightly sandblasted, was coated most rapidly when the flame was directed normal to the metal surface and about 5 inches therefrom. Using a No. 3 tip for fine spraying (into crevices, etc.) and a No. 5 tip for relatively flat or large areas, a rate of coating buildup of from ½ to 1 mil per square inch per minute was attained. The coating was very refractory and tightly adherent to the metal surface.

*Example III*

A flame spraying mixture was prepared using ground acid-washed corundum (−325 mesh) with 5 percent of lithium aluminate added. The powder was fed into the apparatus described in Example II. The rate of spray application (for Ox-5 tip, hydrogen pressure 10 p.s.i.g., oxygen pressure 16 p.s.i.g.) was found to be approximately 2 mils per square inch per second. This was a weight deposition rate of approximately 3.3 gm./second. Optical particle temperature in the flame was in excess of 1150° C. The white coating had a superficial vitreous appearance, tristimulus reflectivities of 75.6, 76.0, and 71.6 in the green, amber, and blue ranges, and an average density approaching 3.0 gm./cc., or a porosity of 15–18 percent. Its Knoop hardness was 1313. The Vickers hardness values depended somewhat on the thickness of coating and hardness of underlying metal but were generally in the range 1580–1640.

The coating was successfully applied to glass, a variety of refractories, steel and ferrous alloys, electrode carbon, titanium, magnesium, molybdenum, aluminum, gold, platinum, palladium, nickel and chromium plate, Inconel, Nichrome, Kauthal A, and Duriron. Although the coating is difficult to apply to copper and its alloys, good adhesion has been obtained in a number of instances. When non-washed corundum is used, the coating is not white but adheres equally well. The composition of the coating, estimated from X-ray diffraction photographs, is less than one-half alpha-alumina and more than one-half gamma alumina.

This coating is quite refractory, possesses a high degree of electrical resistivity, and may be built up in thickness, coatings approaching 0.1 inch thick having been obtained.

If a small percentage of finely powdered nickel is milled into the coating composition, a coating is obtained which contains alpha alumina, gamma alumina, and a spinel structure believed to be $NiO.Al_2O_3$ which is apparently isomorphous with gamma alumina. This coating is highly resistant to attack by mineral acids. The inclusion of fine aluminum powder in the mixture produces a coating with a high degree of resistance to oxidation of the underlying substrate.

*Example IV*

Certain mineral products can, if ground sufficiently fine, be fed directly into the flame without additives. These include ilmenite, rutile, kyanite, sillimanite, bauxite, and zircon. Mesh sizes should be less than 325 (44 microns) and results are more consistent if the powders are less than 500 mesh (30 microns) in size.

All of these minerals contain iron as a natural impurity homogeneously dispersed in the crystalline structure of the mineral.

For such minerals, any addition which increases the flame temperature improves the maximum permissible spraying rate or coating hardness. For example, fine aluminum powder, powdered ferrosilicon (50–90% Si), nickel, or chromium can be added to the coating composition. Powdered iron exerts a small but measurable improvement with ilmenite, but the resulting coating is not corrosion-resistant. Lithium aluminate, lithium fluoride, and powdered molybdenum increase the particle temperature slightly (50 to 100° C.). These coatings appear to be useful in applications where economy is paramount, as in forming skid-resistant coatings for metal gratings, refractory coatings for brick and the like.

I claim as my invention:

1. The method of applying an adherent refractory coating onto a surface, which comprises injecting solid crystalline particles of an oxygen-containing material which material is refractory at 1200° C. into a gaseous stream being fed into a continuous flame generating device, maintaining the flame temperature and residence time of said particles in said flame at a value to heat the particles to sintering temperature in the flame, and impinging the hot particles on the surface to form a crystalline deposit of the resulting sintered particles as an adherent coating on said surface.

2. The method of applying an adherent refractory coating onto a surface, which comprises injecting a mixture of solid particles of crystalline isomorphous oxygen-containing materials which materials are refractory at 1200° C. into a gaseous stream being fed into a continuous flame generating device, maintaining the flame temperature and residence time of said particles in said flame at a value to heat the particles to sintering temperature in the flame, and impinging the hot particles on the surface to form a crystalline deposit of the resulting sintered particles as an adherent coating on said surface.

3. The method of applying an adherent refractory coating onto a surface, which comprises injecting a mixture of particles of alpha alumina and lithium aluminate into a continuous flame of a combustion zone, maintaining the flame temperature and residence time of said particles in said flame at a value to heat the particles to sintering temperature in the flame, and impinging the hot particles on the surface to form a crystalline deposit of the resulting sintered particles as an adherent coating on said surface.

4. The method of applying an adherent refractory coating onto a surface, which comprises injecting into a continuous flame of a combustion zone a mixture of particles of a solid crystalline oxygen-containing material which material is refractory at 1200° C. and from about 0.1% to about 10% by weight thereof of a powdered metal, maintaining the flame temperature and residence time of said particles in said flame at a value to heat the particles to sintering temperature in the flame, and impinging the hot particles on the surface to form a crystalline deposit of the resulting sintered particles as an adherent coating on said surface.

5. The method of applying an adherent refractory coating onto a surface, which comprises injecting into a continuous flame of a combustion zone a mixture of particles of a solid crystalline oxygen-containing material which material is refractory at 1200° C. and from about 0.1% to about 10% by weight thereof of a powdered oxide catalyst for the combustion reaction, maintaining the flame temperature and residence time of said particles in said flame at a value to heat the particles to sintering temperature in the flame, and impinging the hot particles on the surface to form a crystalline deposit of the resulting sintered particles as an adherent coating on said surface.

6. The method claimed in claim 1 wherein said oxygen-containing material is selected from the group consisting of alpha alumina and zirconia.

7. The method of applying an adherent refractory coating onto a surface, which comprises injecting particles of ilmenite into a continuous flame of a combustion zone, maintaining the flame temperature and residence time of said particles in said flame at a value to heat the particles to sintering temperature in the flame, and impinging the hot particles on the surface to form a crystalline deposit of the resulting sintered particles as an adherent coating on said surface.

8. The method of applying an adherent refractory coating onto a surface, which comprises injecting rutile particles into a continuous flame of a combustion zone, maintaining the flame temperature and residence time of said particles in said flame at a value to heat the particles to sintering temperature in the flame, and impinging the hot particles on the surface to form a crystalline deposit of the resulting sintered particles as an adherent coating on said surface.

References Cited in the file of this patent

UNITED STATES PATENTS

| | | |
|---|---|---|
| 2,462,681 | Schaefer | Feb. 22, 1949 |
| 2,663,658 | Schurecht | Dec. 22, 1953 |
| 2,707,691 | Wheildon | May 3, 1955 |
| 2,711,975 | Waiver | June 28, 1955 |
| 2,775,531 | Montgomery | Dec. 25, 1956 |

FOREIGN PATENTS

| | | |
|---|---|---|
| 179,216 | Great Britain | Apr. 27, 1922 |
| 543,773 | Great Britain | Mar. 12, 1942 |